(12) United States Patent
Berger et al.

(10) Patent No.: US 9,816,607 B2
(45) Date of Patent: Nov. 14, 2017

(54) HYDRAULIC CONTROL SYSTEM FOR AN AUTOMATIC TRANSMISSION

(71) Applicant: GM Global Technology Operations LLC, Detroit, MI (US)

(72) Inventors: Todd R. Berger, Pinckney, MI (US); Kevin Michael Dougan, Plymouth, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 50 days.

(21) Appl. No.: 14/993,630

(22) Filed: Jan. 12, 2016

(65) Prior Publication Data

US 2016/0153550 A1    Jun. 2, 2016

Related U.S. Application Data

(62) Division of application No. 13/936,714, filed on Jul. 8, 2013, now Pat. No. 9,254,831.

(60) Provisional application No. 61/677,781, filed on Jul. 31, 2012.

(51) Int. Cl.
| | |
|---|---|
| *F16H 61/02* | (2006.01) |
| *B60W 10/02* | (2006.01) |
| *B60W 10/11* | (2012.01) |
| *F16H 61/686* | (2006.01) |

(52) U.S. Cl.
CPC ......... *F16H 61/0267* (2013.01); *B60W 10/02* (2013.01); *B60W 10/11* (2013.01); *F16H 61/0206* (2013.01); *F16H 61/686* (2013.01); *F16H 2200/0069* (2013.01)

(58) Field of Classification Search
None
See application file for complete search history.

(56) References Cited

U.S. PATENT DOCUMENTS

| | | | |
|---|---|---|---|
| 3,754,482 A | 8/1973 | Sanders et al. | |
| 4,351,206 A | 9/1982 | Lemieux et al. | |
| 5,406,483 A | 4/1995 | Kallis et al. | |
| 5,626,536 A * | 5/1997 | Kono | B60W 10/06 192/3.3 |
| 6,024,671 A * | 2/2000 | Sawa | F16H 61/0206 477/131 |
| 6,464,610 B1 * | 10/2002 | Hisano | F16H 61/12 475/119 |
| 6,569,050 B2 | 5/2003 | Suzuki et al. | |
| 2001/0054532 A1 * | 12/2001 | Ohashi | F16H 61/0206 192/51 |
| 2003/0045400 A1 * | 3/2003 | Ito | B60W 30/1819 477/176 |
| 2003/0114261 A1 * | 6/2003 | Moorman | F16H 61/0206 475/116 |
| 2010/0105522 A1 | 4/2010 | Hagelskamp | |
| 2011/0303040 A1 | 12/2011 | Hagelskamp | |

FOREIGN PATENT DOCUMENTS

CN    102121528 A    7/2011

\* cited by examiner

*Primary Examiner* — Justin Holmes

(57) ABSTRACT

A hydraulic control system for a transmission includes a source of pressurized hydraulic fluid that communicates with an electronic transmission range selection (ETRS) subsystem or manual valve and a clutch actuation subsystem.

3 Claims, 18 Drawing Sheets

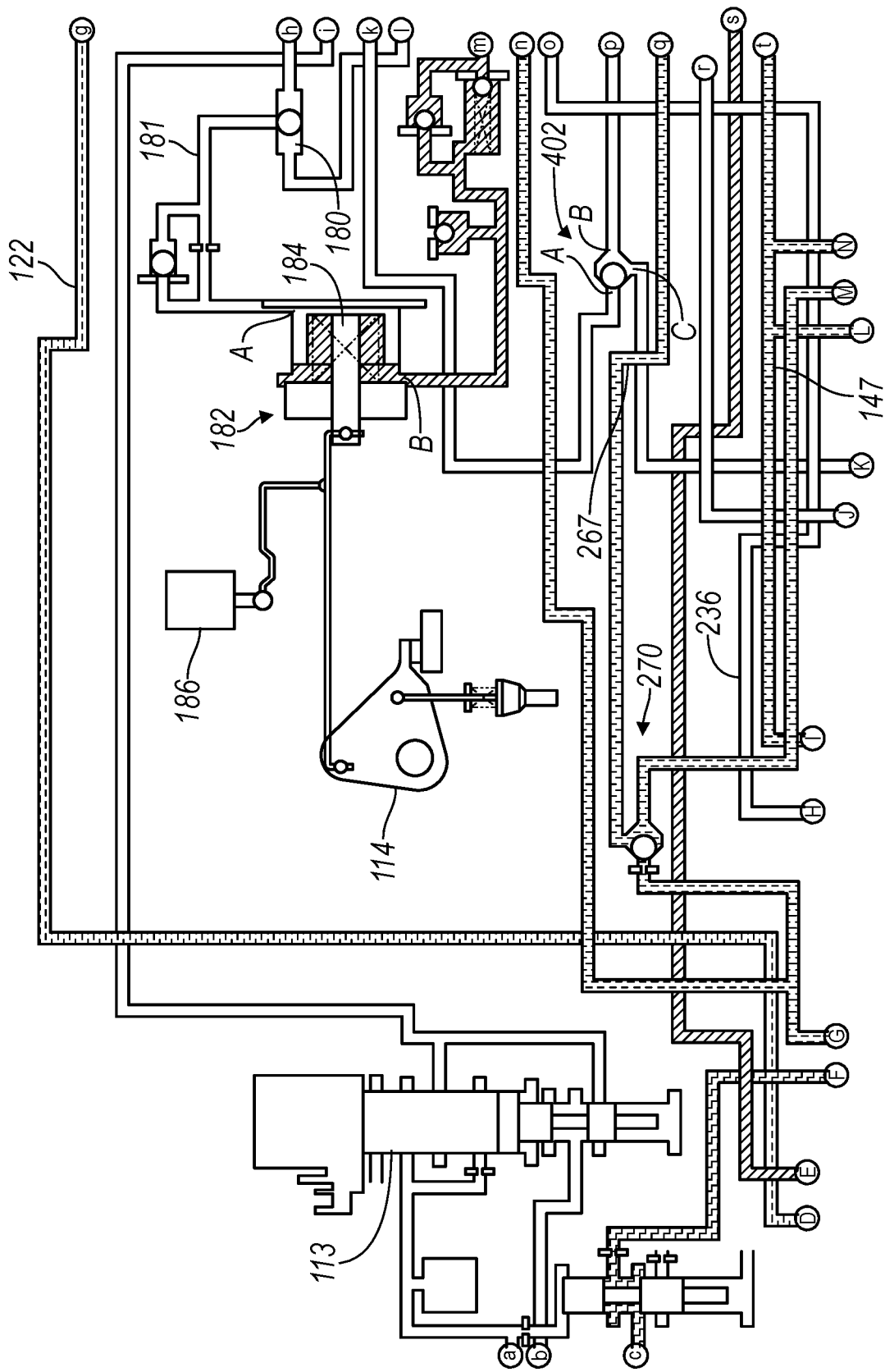

HYDRAULIC CONTROL SYSTEM FOR AN AUTOMATIC TRANSMISSION

CROSS-REFERENCE TO RELATED APPLICATIONS

This application is a divisional of U.S. patent application Ser. No. 13/936,714, filed on Jul. 8, 2013, which claims the benefit of U.S. Provisional Patent Application No. 61/677,781, filed Jul. 31, 2012.

The entire contents of the above applications are incorporated herein by reference.

TECHNICAL FIELD

The invention relates to a control system for an automatic transmission, and more particularly to an electro-hydraulic control system.

BACKGROUND

A typical automatic transmission includes a hydraulic control system that is employed to provide cooling and lubrication to components within the transmission and to actuate a plurality of torque transmitting devices. These torque transmitting devices may be, for example, friction clutches and brakes arranged with gear sets or in a torque converter. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices. The pressurized hydraulic fluid delivered to the shift actuators is used to engage or disengage the torque transmitting devices in order to obtain different gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a hydraulically actuated automatic transmission.

SUMMARY

A hydraulic control system for a transmission is provided. The hydraulic control system includes a source of pressurized hydraulic fluid that communicates with an analog electronic transmission range selection (ETRS) subsystem. The ETRS subsystem communicates with a clutch actuator subsystem that engages a plurality of clutches/brakes. In another implementation, the source of pressurized hydraulic fluid communicates with a manual valve.

In another aspect, a hydraulic control system includes a pressure regulator subsystem with a source of pressurized hydraulic fluid for providing a flow of hydraulic fluid, a manual valve and a default valve, and a clutch actuation control subsystem that provides pressurized hydraulic fluid to a plurality of clutch actuators through a plurality of clutch valve assemblies. The manual valve and the default valve connects the pressure regulator subsystem with the clutch control subsystem, and movement of a range selector translates the manual valve to various Drive and Reverse positions. The plurality of clutch actuators may include six clutch actuators. And each of the clutch actuators may be a hydraulically actuated piston that engages one of a plurality of torque transmitting devices to achieve a desired speed ratio.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIGS. 2A-2F describe another embodiment of a hydraulic control system in accordance the principles of the present invention.

DESCRIPTION

Figure 1A:
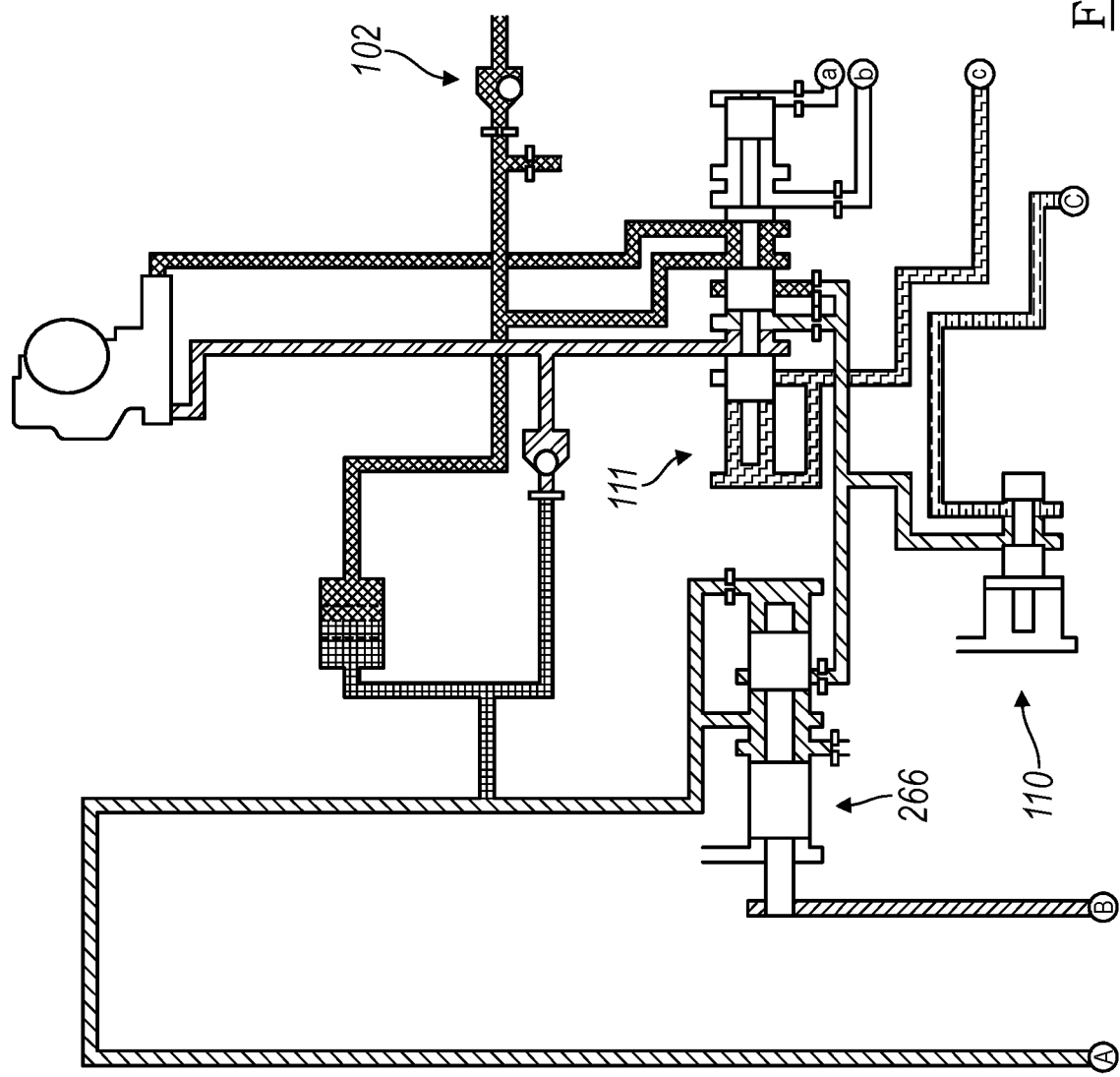
FIGS. 1A-1F describe a hydraulic control system in accordance with the principles of the present invention.
Figure 1B:
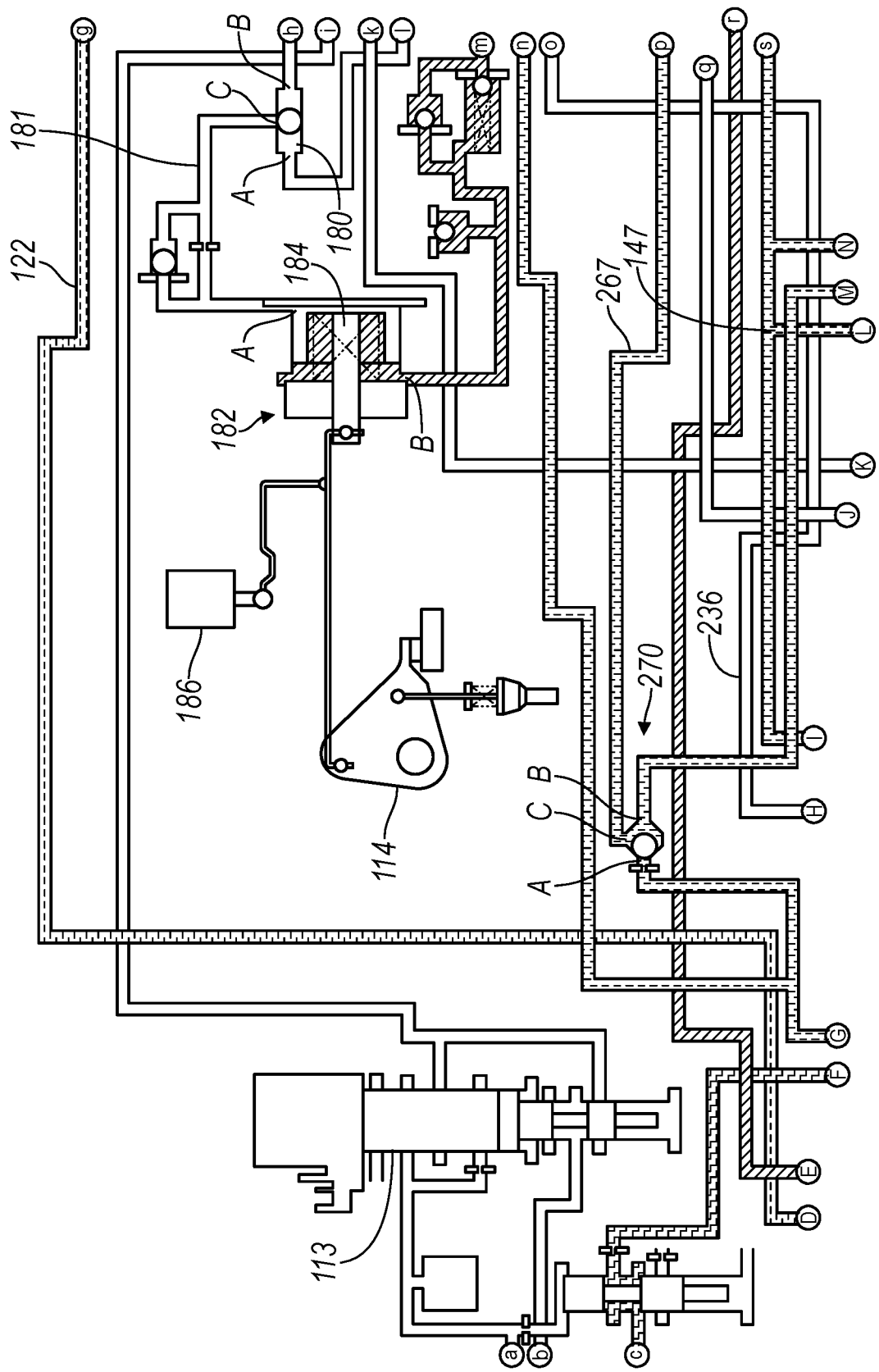
Figure 1C:
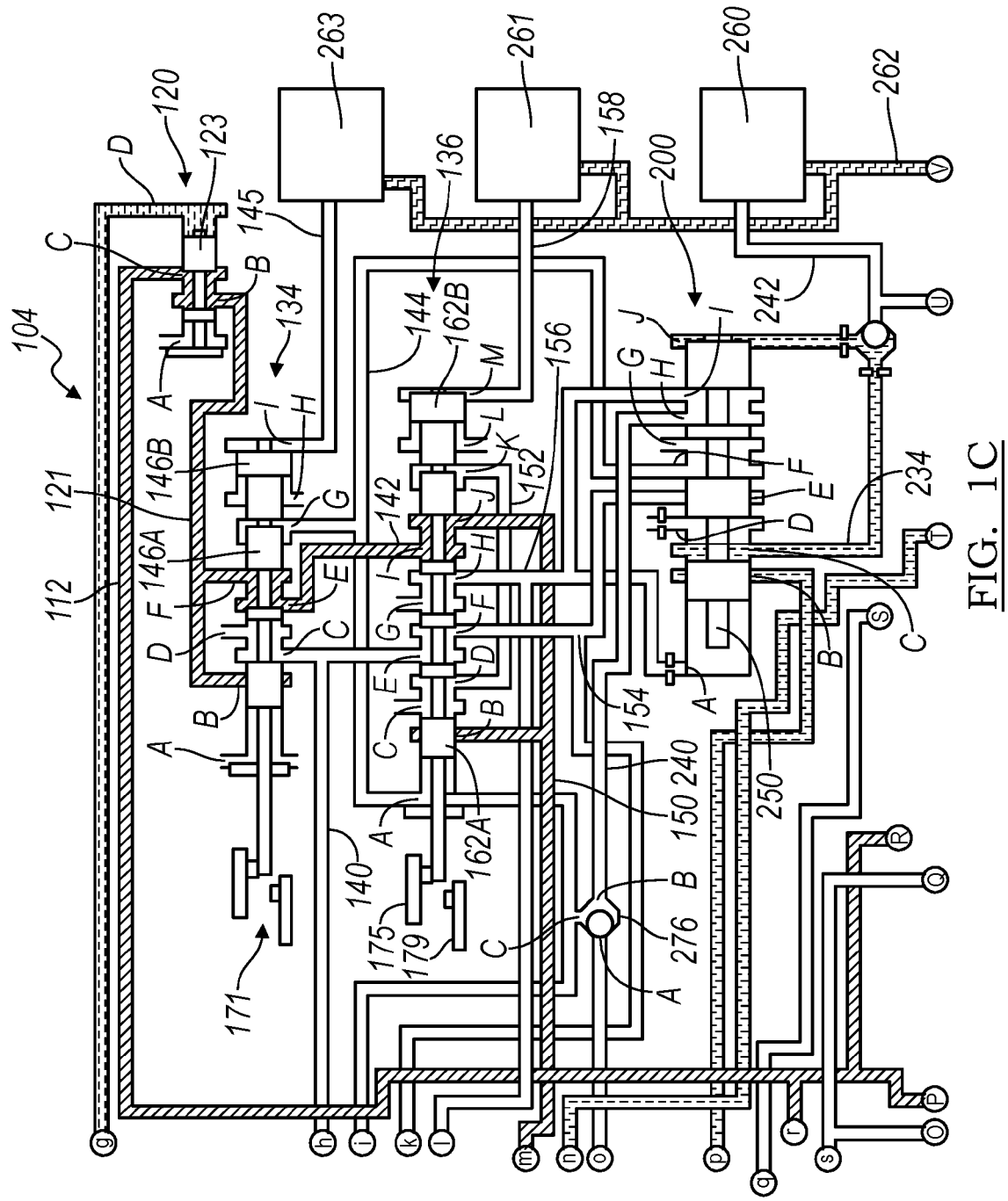
Figure 1D:
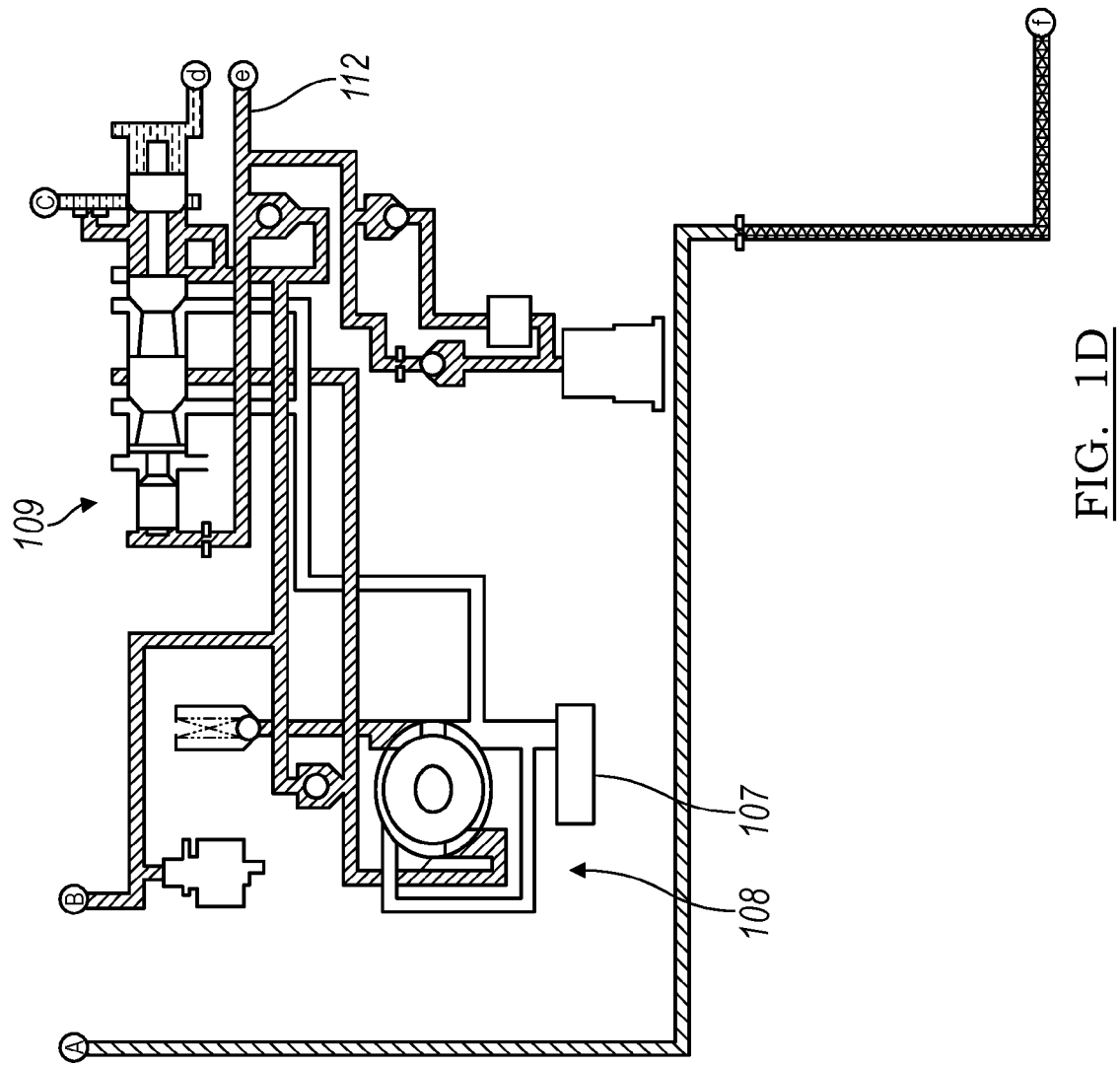
Figure 1E:
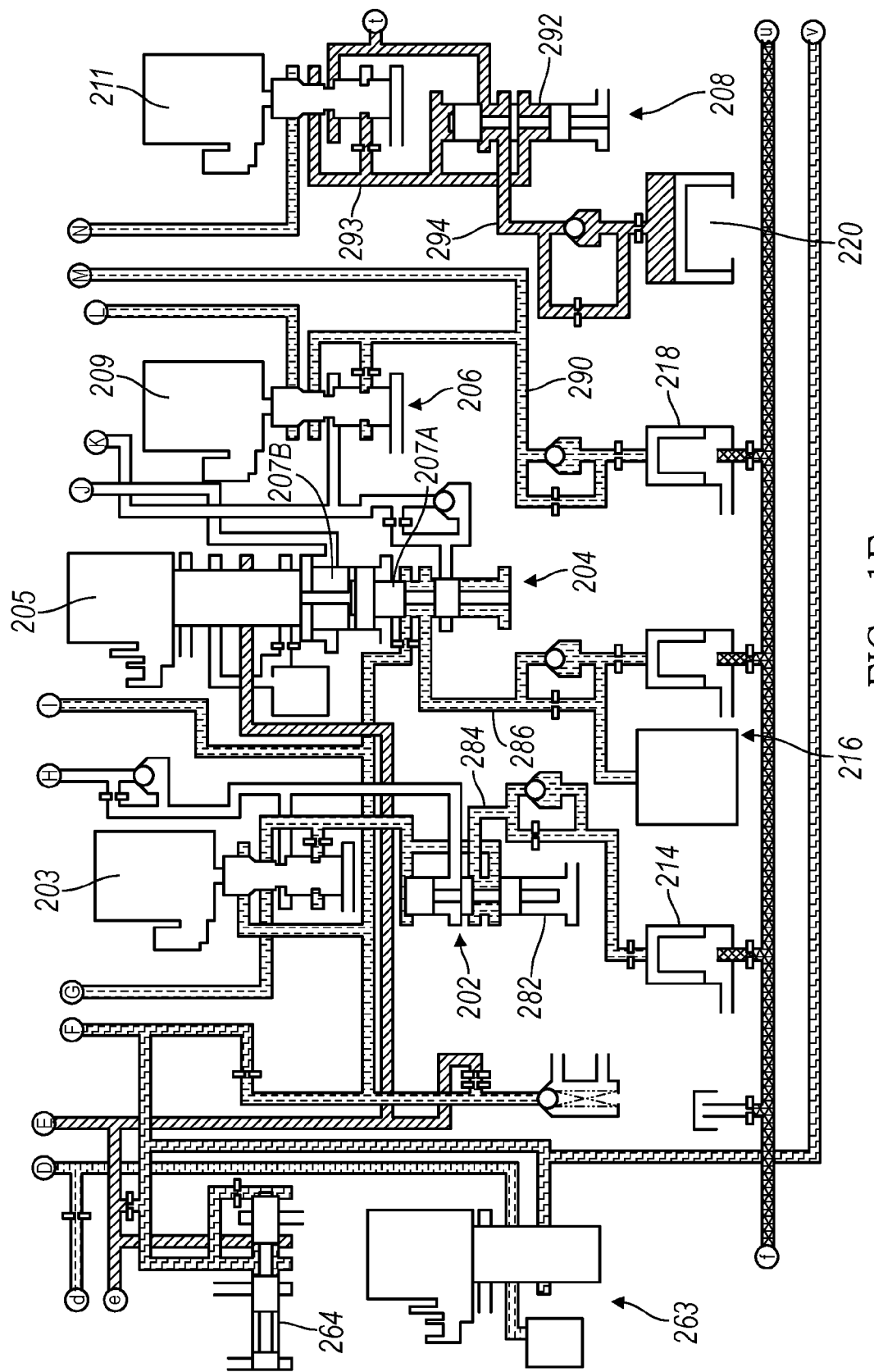
Figure 1F:
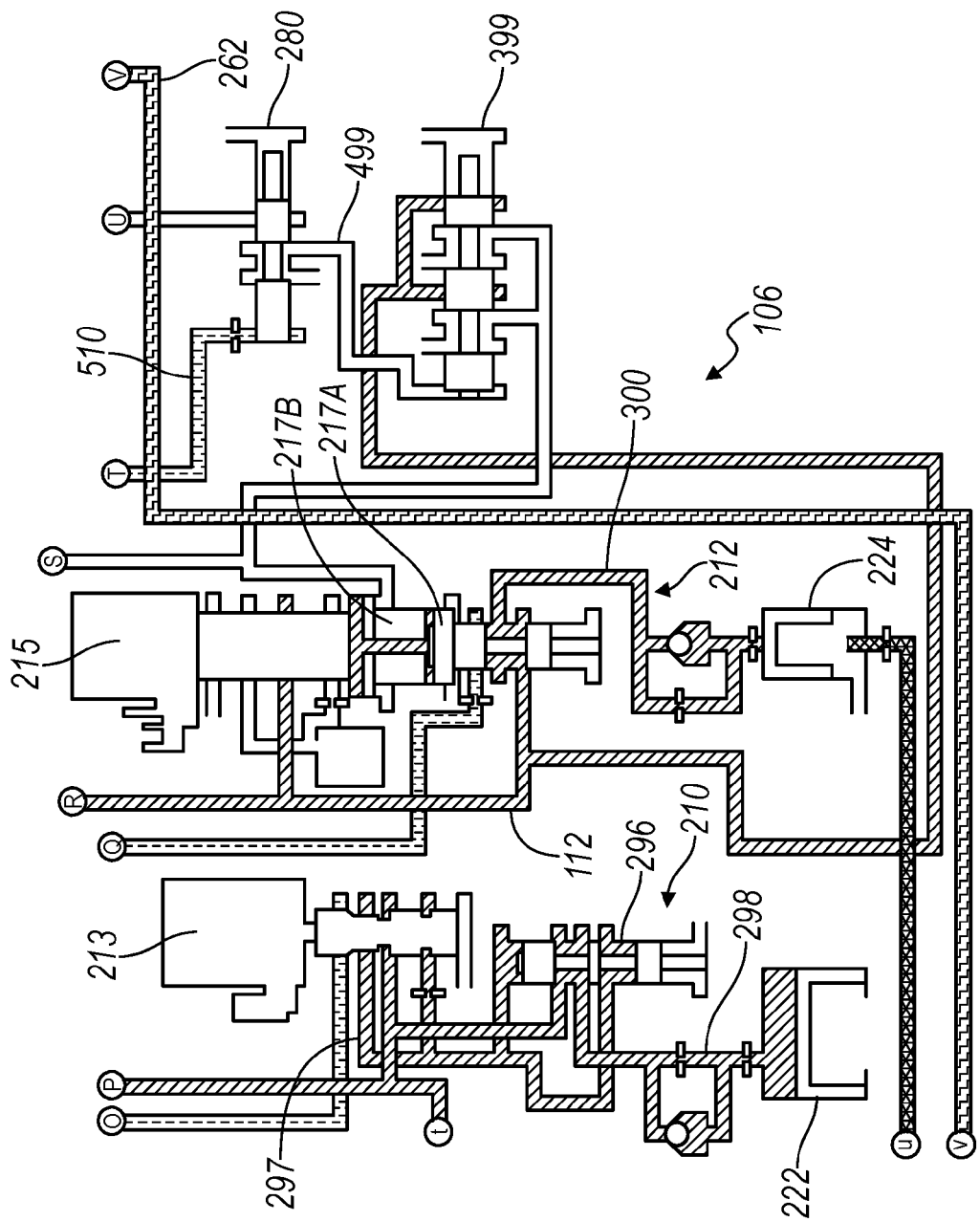

With reference to FIGS. 1A-1F, a portion of a hydraulic control system according to the principles of the present invention is generally indicated by reference number 100. The hydraulic control system 100 generally includes a plurality of interconnected or hydraulically communicating subsystems including a pressure regulator subsystem 102, an electronic transmission range selection (ETRS) control subsystem 104, and a clutch control subsystem 106. The hydraulic control system 100 may also include various other subsystems or modules, such as a lubrication subsystem, a torque converter clutch subsystem, and/or a cooling subsystem, without departing from the scope of the present invention.

The pressure regulator subsystem 102 is operable to provide and regulate pressurized hydraulic fluid, such as transmission oil, throughout the hydraulic control system 100. The pressure regulator subsystem 102 draws hydraulic fluid from a sump 107. The sump 107 is a tank or reservoir preferably disposed at the bottom of a transmission housing to which the hydraulic fluid returns and collects from various components and regions of the transmission. The hydraulic fluid is forced from the sump 107 and communicated throughout the hydraulic control system 100 via a pump 108. The pump is preferably driven by an engine (not shown) and may be, for example, a gear pump, a vane pump, a gerotor pump, or any other positive displacement pump. The pressure regulator subsystem 102 may also include an alternate source of hydraulic fluid that includes an auxiliary pump (not shown) preferably driven by an electric engine, battery, or other prime mover (not shown). The pump 108 feeds pressurized hydraulic fluid at line pressure to a line pressure regulator valve 109. The line pressure regulator valve 109 communicates pressurized hydraulic fluid to a converter feed limit valve 110, a torque converter clutch (TCC) control valve 111, and a main supply line 112. The lubrication flow regulator valve 266 and the TCC control valve 111 each feed lubrication and TCC circuits. The main supply line 112 feeds the ETRS subsystem 104 and the clutch actuator subsystem 106.

The ETRS control subsystem 104 connects the pressure regulator subsystem 102 with the clutch control subsystem 106. Generally, the ETRS control subsystem 104 converts electronic input for a requested range selection (Drive, Reverse, Park) into hydraulic and mechanical commands. The hydraulic commands use line pressure hydraulic fluid from the pressure regulator subsystem 102 via fluid line 112 to supply hydraulic fluid to the clutch actuator subsystem 106. The mechanical commands include engaging and disengaging a park mechanism 114.

The ETRS control subsystem 104 includes an enablement valve assembly 120. The enablement valve assembly includes fluid ports 120A-D. Fluid port 120A is an exhaust port that communicates with the sump 107. Fluid port 120B communicates with a first mode valve assembly 134 through a feed line 121. Fluid port 120C communicates with the main supply line 112. Fluid port 120D communicates with a signal line 122. The enablement valve assembly 120 further includes a spool valve 123 slidably disposed within a bore 124. When pressurized fluid is supplied through the signal line 122, fluid pressure acts upon the spool valve 123 through the fluid port 120D. When the spool valve 123 is stroked, the fluid port 120C communicates with the fluid port 120B.

In addition to the first mode valve assembly, the ETRS subsystem 104 includes second mode valve assembly 136 that communicate in series with one another and with the enablement valve assembly 120. The first mode valve 134 includes spool valves 146A and 146B and further includes ports 134A-I, numbered consecutively from left to right. Ports 134A, D, and H are exhaust ports that communicate with the sump 107. Ports 134B and 134F communicate with the range feed line 121. Port 134C communicates with a fluid line 140. Port 134E communicates with a fluid line 142. Port 134G communicates with a fluid line 144. Port 134I communicates with a signal line 145.

The spool valves 146A and 146B are actuated by the hydraulic fluid provided through lines 144 and from solenoid 263 via line 145. The spool 146A is moveable between a stroked position and a de-stroked position. In the de-stroked position port 134F communicates with port 134E. Accordingly, the range feed line 121 communicates with line 142. When the first mode valve assembly 134 is stroked, port 134F is closed while port 134E exhausts and port 134B communicates with port 134C such that the range feed line 121 communicates with line 140.

The second mode valve assembly 136 generally includes ports 136A-M. Ports 136C, 136G, and 136L are exhaust ports that communicate with the sump 107. Port 136A communicates with the fluid line 144. Ports 136B and 136J communicate with a Park feed line 150. Port 136D communicates with a sequence line 152 that communicates with port 136K. Port 136E communicates with fluid line 140. Port 136F communicates with a Drive line 154. Port 136H communicates with a Reverse line 156. Port 136I communicates with fluid line 142. Fluid port 136M communicates with a signal line 158.

The second mode valve assembly 136 includes spool valves 162A and 162B actuated by the hydraulic fluid provided through lines 144 and from solenoid 261 via line 158. The spool valve 162A is moveable between a stroked position and a de-stroked position. In the de-stroked position, port 136E communicates with port 136F and port 136I communicates with port 136J and port 136H exhausts. Therefore, when the first mode valve assembly 134 is stroked, the transmission is in "Drive" when the second mode valve assembly 136 is de-stroked and is providing hydraulic fluid to Drive line 154 and to the "1 feed" line 140, which will be described in further detail below. In the stroked position the port 136E communicates with the port 136D providing signal feedback to port 136K. Also, port 136I communicates with port 136H and feeds the Reverse fluid line 156 while ports 136B and 136F exhaust.

The first mode valve assembly 134 may include either one or two position sensors 171, and the second mode valve assembly 136 may include a pair of position sensors 175, 179, by way of example.

A check valve 180 is connected to fluid lines 140 and 156. The check valve 180 includes three ports 180A-C. The check valve 180 closes off whichever of the ports 180A and 180B that is delivering the lower hydraulic pressure and provides communication between whichever of the ports 180A and 180B having or delivering the higher hydraulic pressure and the outlet port 180C. Port 180A is connected to the Reverse fluid line 156. Port 180B is connected to fluid line 140. Port or outlet 180C is connected to an out-of-Park (OOP) fluid line 181.

The into-Park fluid line 150 and the OOP fluid line 181 each communicate with a Park servo valve 182. The Park servo valve 182 includes ports 182A and 182B each located on either side of a piston 184. The piston 184 is mechanically coupled to the park mechanism 114. Port 182A communicates with the OOP fluid line 181 and port 182B communicates with the into-Park fluid line 150. The piston 184 moves upon contact by the hydraulic fluid supplied by one of the fluid lines 181, 150, thereby mechanically disengaging or engaging the Park mechanism 114.

The Park mechanism 114 is connected with an out-of-Park (OOP) solenoid 186. The OOP solenoid 186 is actuatable to mechanically prevent the Park mechanism 114 from engaging during an engine stop-start event (i.e. when the vehicle is intended to be mobile during an automatic engine stop). The OOP 184 solenoid may also be used to keep the Park servo 182 disengaged when it is desirable to operate in Drive or Reverse at other times.

As noted above, the ETRS subsystem 104 feeds hydraulic fluid to the clutch actuation control subsystem 106 via the range feed line 121, the Drive line 154 and the Reverse line 156 while the clutch actuation control subsystem 106 provides hydraulic control signals back to the ETRS subsystem 104 via signal line 144.

The clutch actuation control subsystem 106 generally includes a clutch select valve assembly 200 and a plurality of clutch regulation assemblies 202, 204, 206, 208, 210, and 212. Each of the clutch regulation assemblies 202-212 are associated with one of a plurality of clutch actuators 214, 216, 218, 220, 222, and 224. The clutch actuators 214-224 are hydraulically actuated pistons that each engage one of a plurality of torque transmitting devices (clutches or brakes) to achieve various forward, or drive, speed ratios and reverse speed ratios.

The clutch select valve assembly 200 generally includes ports 200A-J. Ports 200D and 200G are exhaust ports that communicate with the sump 107. Port 200A communicates with the fluid line 156. Port 200B communicates with the clutch regulation assemblies 202 and 206. Port 200C communicates with a clutch feed line 234. Port 200E communicates with the feed line 154. Port 200F communicates with line 144 which provides a control signal back to ETRS subsystem 104. Port 200H communicates with a feed line 240. Port 200I communicates with the signal line 156. Port 200J communicates with the lines 234 and 242.

The clutch select valve assembly 200 includes a spool valve 250 slidably disposed within a bore. The spool valve 250 is moveable between a stroked position and a de-stroked position. In the de-stroked position, port 200B is closed, ports 200D and 200G exhaust, port 200C communicates with port 200J. Therefore in the stroked position, the clutch select valve 200 provides hydraulic fluid to the signal line 144 and provides hydraulic fluid to clutch feed line 236. The signal line 144 communicates with valve assembly 134 and valve assembly 136. The feed line 236 communicates with the clutch actuator 214. In the stroked position port 200I is blocked. In the de-stroked position the Reverse feed line 156 feeds the feed line 240 while the feed line 144 is exhausted.

The clutch select valve assembly 200 is stroked when hydraulic fluid is communicated through a clutch select solenoid 260 to fluid port 200J via signal line 242. The clutch select solenoid 260 receives hydraulic fluid from a feed line 262 that communicates with the main supply line 112 through a feed limit valve 264. The feed line 262 also supplies hydraulic fluid to a solenoid 261 and a solenoid 263.

A check valve 270 is connected to a fluid line 267. The check valve 270 includes three ports 270A-C. The check valve 270 closes off whichever of the ports 270A and 270B that is delivering the lower hydraulic pressure and provides communication between whichever of the ports 270A and 270B having or delivering the higher hydraulic pressure and the outlet port 270C.

A check valve 276 is connected to fluid lines 144 and 240. The check valve 276 includes three ports 276A-C. The check valve 276 closes off whichever of the ports 276B and 276C that is delivering the lower hydraulic pressure and provides communication between whichever of the ports 276B and 276C having or delivering the higher hydraulic pressure and the outlet port 276A.

A clutch gain enable valve assembly 280 selectively communicates with the clutch gain valve 399 via a fluid line 499. The clutch gain enable valve assembly 280 is engaged by the fluid line 510 which is fed by clutch regulation assembly 202.

The clutch regulation assembly 202 includes a variable flow solenoid 203 and a boost valve 282. The solenoid 203 is connected to the boost valve 282, which, in turn, is connected to an actuator feed line 284 that communicates with the clutch actuator 214.

The clutch regulation assembly 204 includes a variable flow solenoid 205, a regulator valve 207A and a regulator valve 207B that are connected to the Drive line 154. The solenoid 205 receives hydraulic fluid from the Drive line 154 and selectively communicates the Drive line hydraulic fluid to an actuator feed line 286. The regular valve 207B has a hole through it to allow the signal from the solenoid 205 to communicate with the regulator valve 207A. The two regulator valves 207A and 207B are separated by a fluid signal from the clutch gain valve assembly 399. This fluid line communicates with fluid signal line 242 when clutch gain enable valve assembly 280 is in the stroked position. Signal line 242 is fed from solenoid 260. The actuator feed line 286 communicates with the clutch actuator 216.

The clutch regulation assembly 206 includes a variable flow solenoid 209. The solenoid 209 is connected to the exhaust backfill line 147 and the drive line 154. The solenoid 209 selectively communicates the Drive/signal line hydraulic fluid to an actuator feed line 290. The actuator feed line 290 communicates with the clutch actuator 218.

The clutch regulation assembly 208 includes a variable flow solenoid 211 and a boost valve 292. The solenoid 211 is connected to the exhaust backfill line 147 and to the line feed 112. The boost valve 292 is connected to the line feed 112 and to an actuator feed line 294. The solenoid 211 receives hydraulic fluid from the line feed 112 and selectively communicates the line feed 112 hydraulic fluid to the signal line 293 in order to move the boost valve 292. The boost valve 292 in turn selectively communicates the Drive/signal line hydraulic fluid to the actuator feed line 294. The actuator feed line 294 communicates with the clutch actuator 220.

The clutch regulation assembly 210 includes a variable flow solenoid 213 and a boost valve 296. The solenoid 213 is connected to the exhaust backfill line 147 and to the line feed 112. The boost valve 296 is also connected to the line feed 112 and to an actuator feed line 298. The solenoid 213 receives hydraulic fluid from the line feed 112 and selectively communicates the line feed 112 hydraulic fluid to the signal line 297 to move boost valve 296. The boost valve 296 in turn selectively communicates the feed line hydraulic fluid to the actuator feed line 298. The actuator feed line 298 communicates with the clutch actuator 222.

The clutch regulation assembly 212 includes a variable flow solenoid 215, a regulator valve 217A and a regulator valve 217B that are connected to the main supply line 112. The solenoid 213 receives hydraulic fluid from the main supply line 112 and selectively communicates the line pressure hydraulic fluid to an actuator feed line 300, which, in turn, communicates with the clutch actuator 224. The regular valve 217B has a hole through it to allow the signal from the solenoid 215 to communicate with the regulator valve 217A. The two regulator valves 217A and 217B are separated by a fluid signal from the clutch gain valve assembly 399.

Selective actuation of combinations of clutch regulator assemblies and valve positions allows the hydraulic control system 100 to selectively engage combinations of the plurality of clutches and brakes.

Figure 2A:
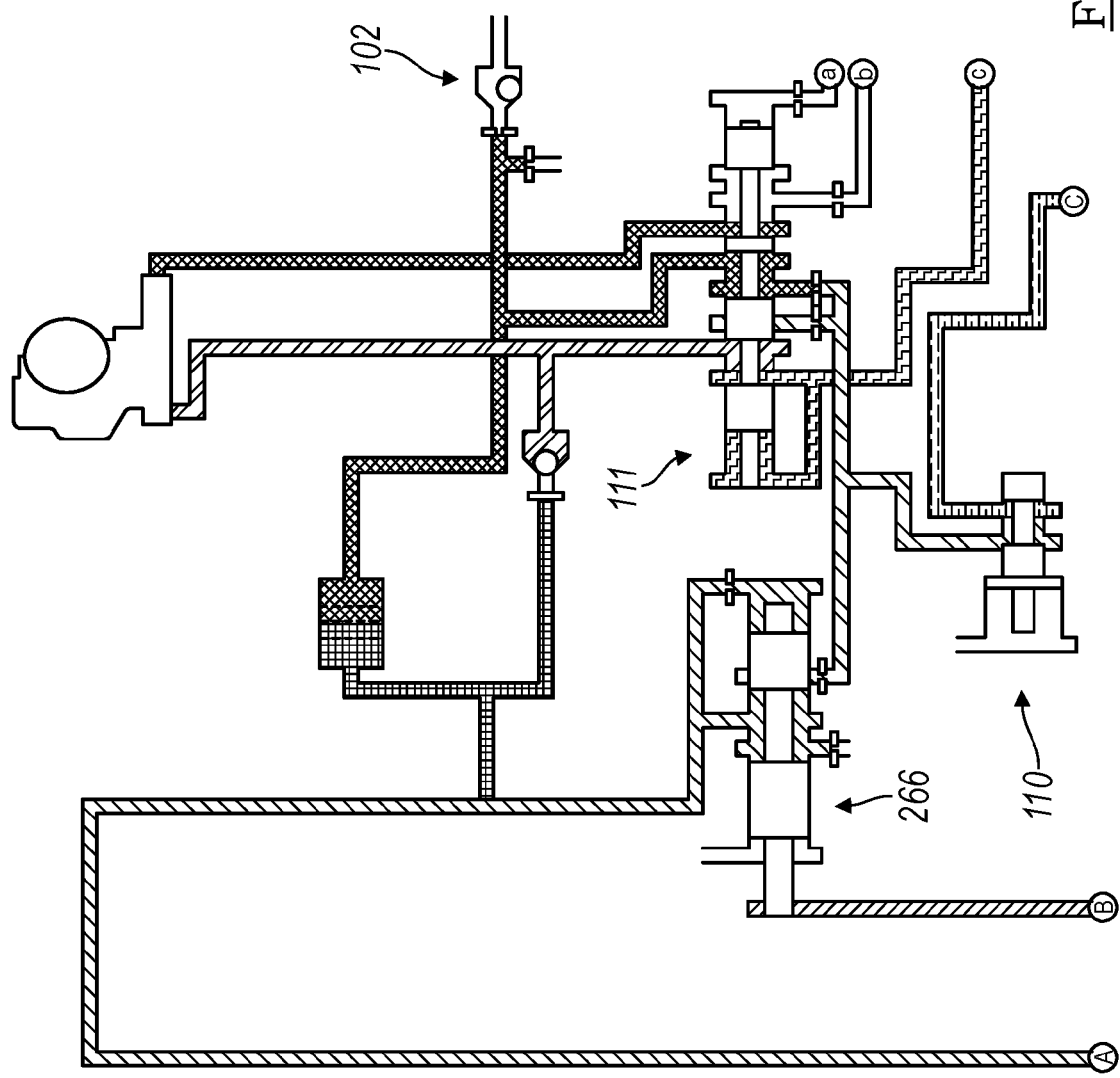
Figure 2C:
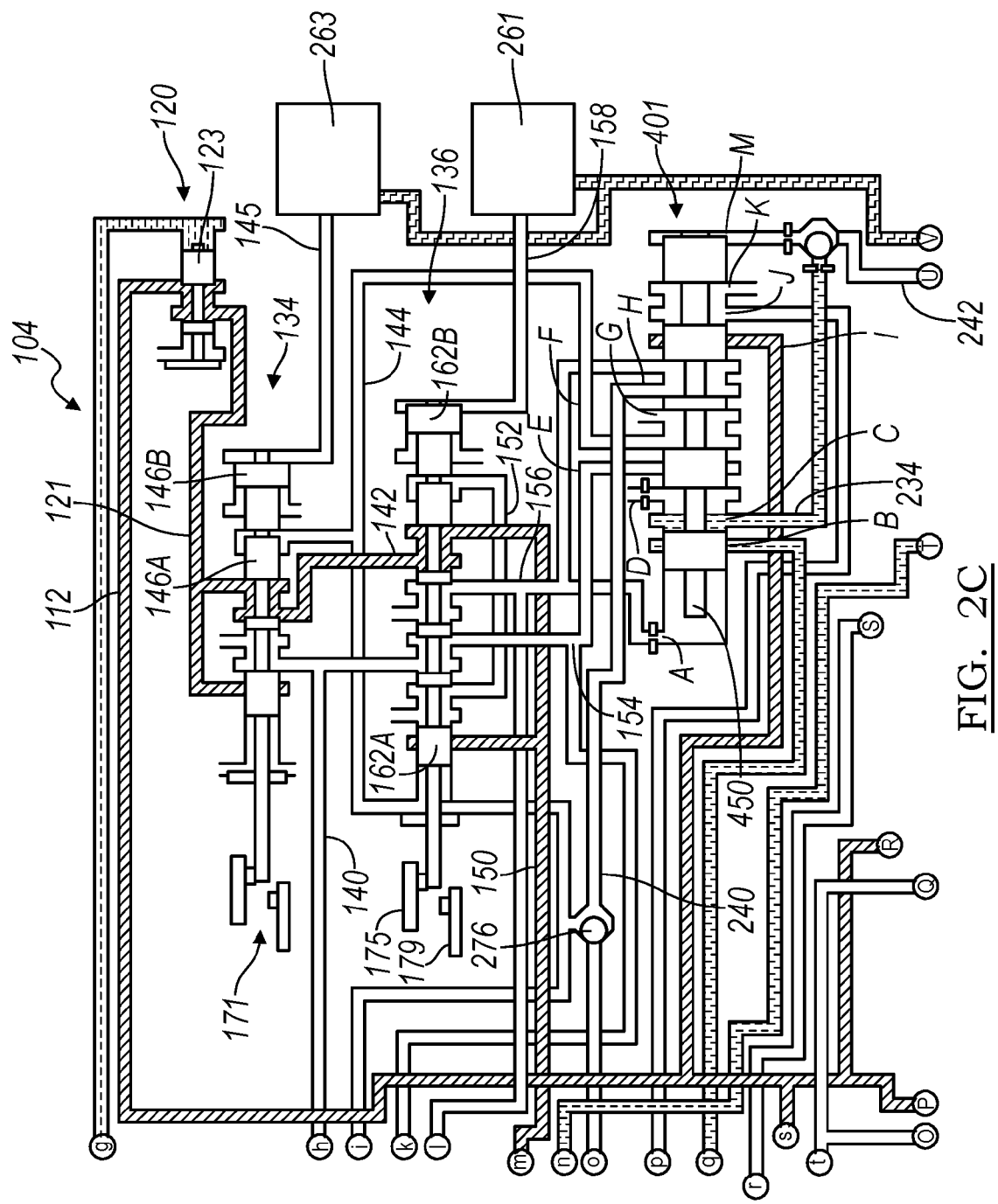
Figure 2D:
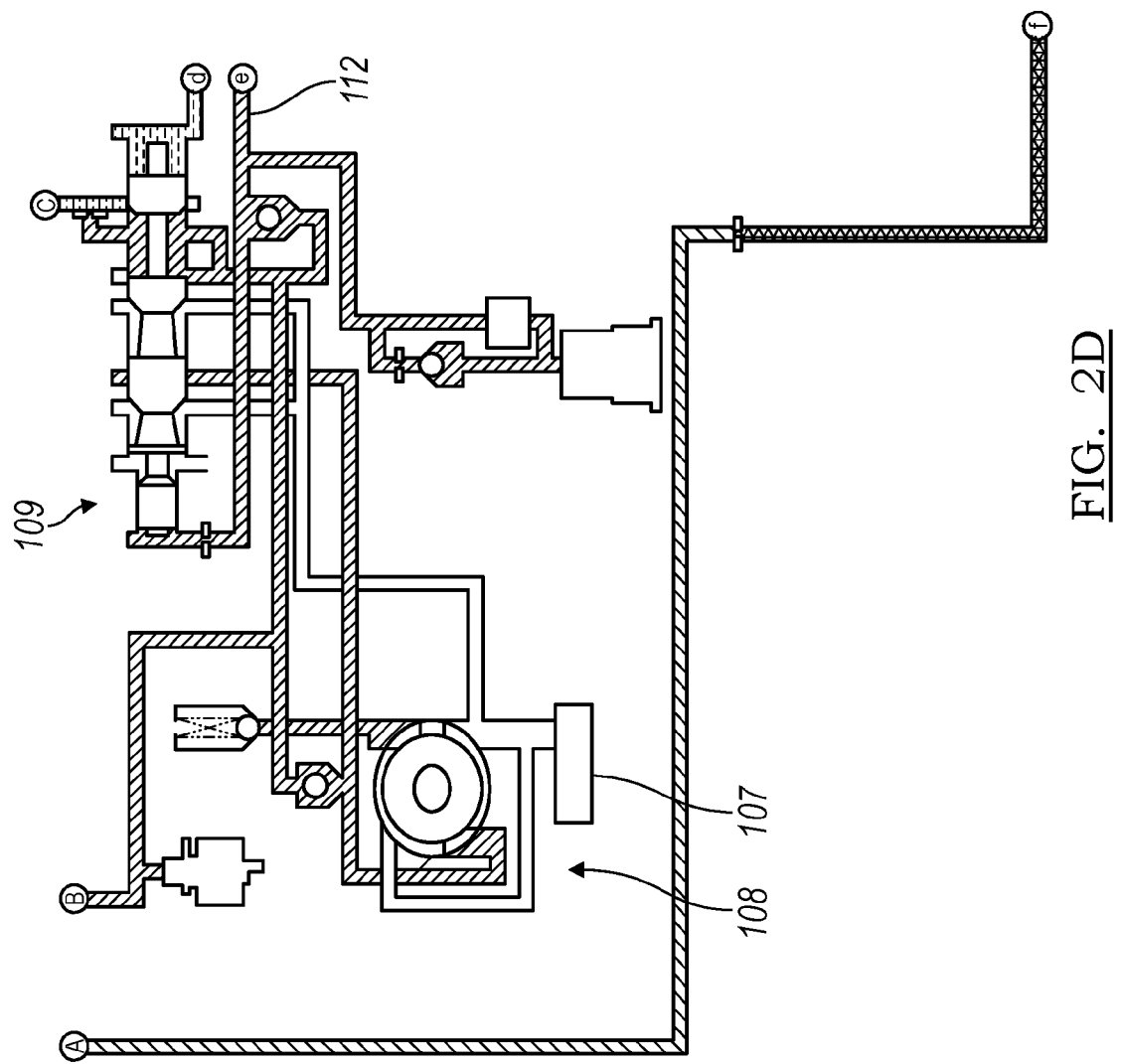
Figure 2E:
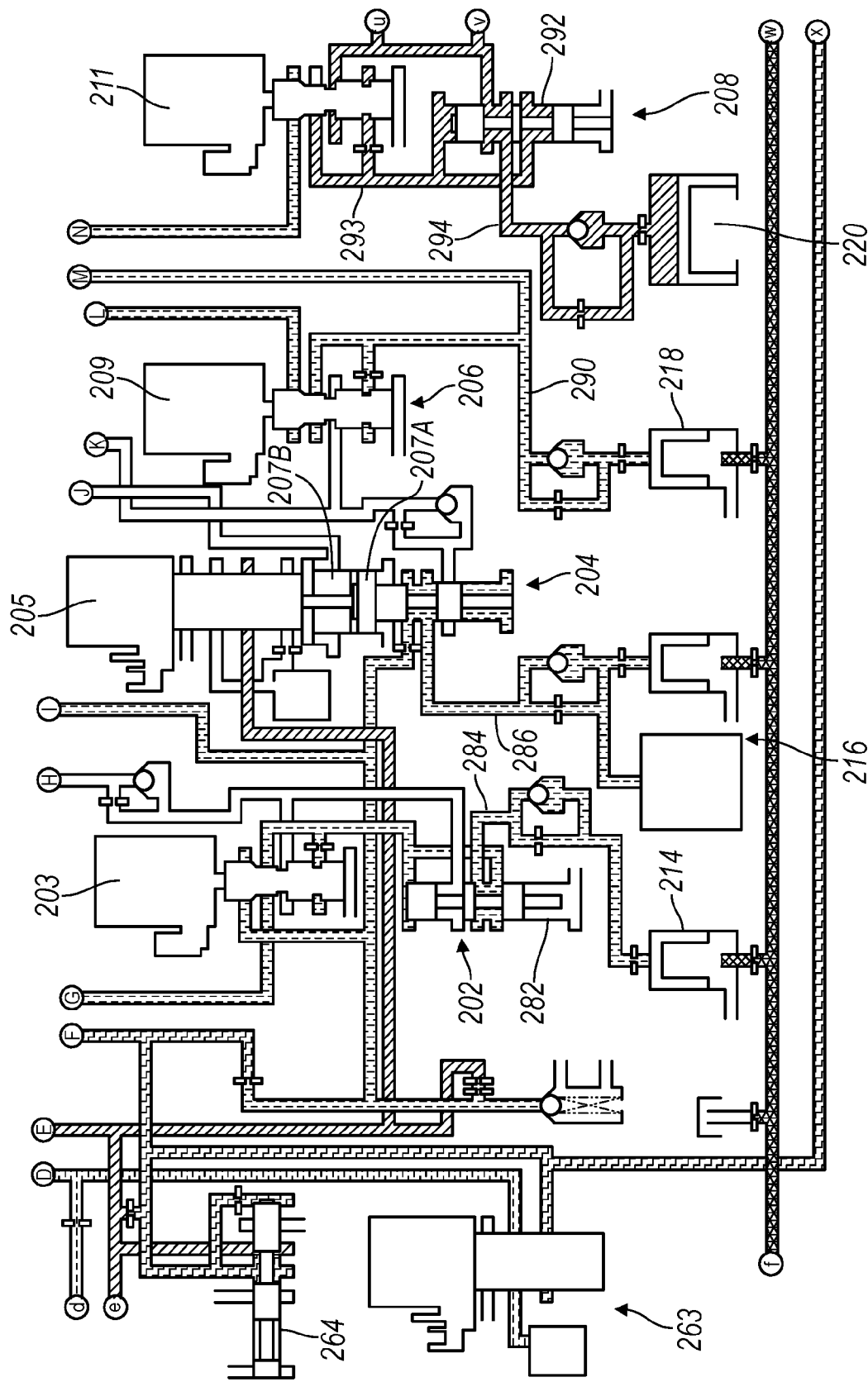
Figure 2F:
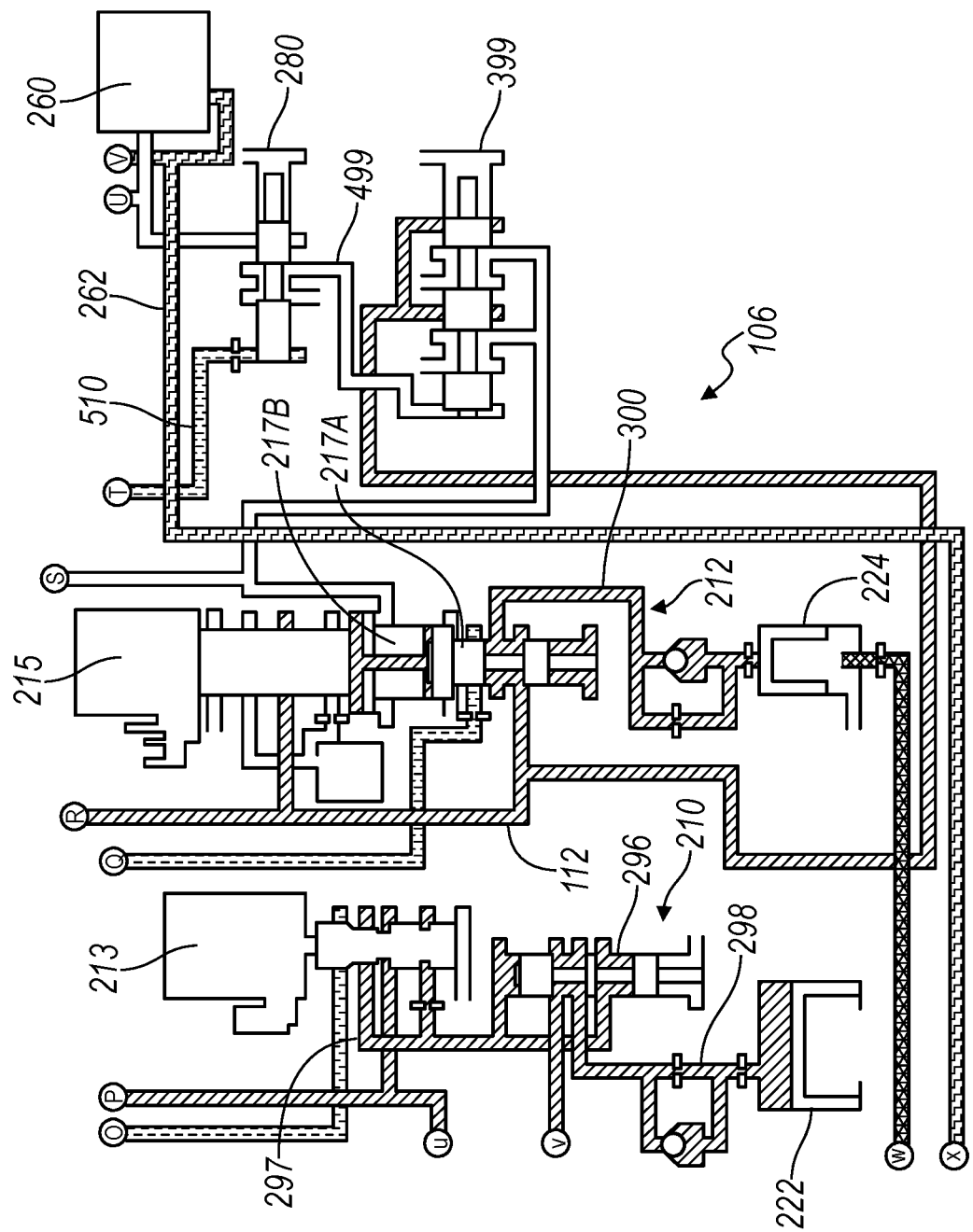

Turning now FIGS. 2A-2F, another arrangement of a hydraulic control system is generally indicated by reference number 400. The hydraulic control system 400 is substantially similar to that shown in FIGS. 1A-1F and like components are indicated by like reference numbers. However, in the hydraulic control system 400, a clutch select valve 401 replaces the clutch select valve 200 shown in FIGS. 1A-1F. The clutch select valve assembly 401 generally includes ports 401A-L. Ports 401D, 401G and 401K are exhaust ports that communicate with the sump 107 or an exhaust backfill circuit. Port 401A communicates with the fluid line 156. Port 401B communicates with the clutch regulation assemblies 202 and 206. Port 401C communicates with a clutch feed line 234. Port 401E communicates with the feed line 154. Port 401F communicates with a clutch feed line 144. Port 401H communicates with a feed line 240. Port 401L communicates with the signal line 156. Port 401J communicates with a check valve 402. And port 401M communicates with the line 234.

The clutch select valve assembly 401 includes a spool valve 450 slidably disposed within a bore. The spool valve 450 is moveable between a stroked position and a de-stroked position. In the de-stroked position, port 401B is closed, ports 401D, 401G and 401K exhaust, port 401C communicates with port 401M. In the stroked position, port 401K is blocked. Therefore the Reverse feed line 156 is also blocked while the clutch feed line 144 feeds feed line 240.

The clutch select valve assembly 401 is stroked when hydraulic fluid is communicated through a clutch select solenoid 260 to fluid port 401M via signal line 242. The clutch select solenoid 260 receives hydraulic fluid from a feed line 262 that communicates with the main supply line 112 through a feed limit valve 264. The feed line 262 also supplies hydraulic fluid to a solenoid 261 and a solenoid 263 that communicates with fluid line 122.

The check valve 402 includes three ports 402A, 402B, and 402C. Port 402A communicates with the line 154. Port 402B communicates with port 401J of the clutch valve assembly 402. And port 402C communicates with the clutch regulation assemblies 204 and 206.

Figure 3A:
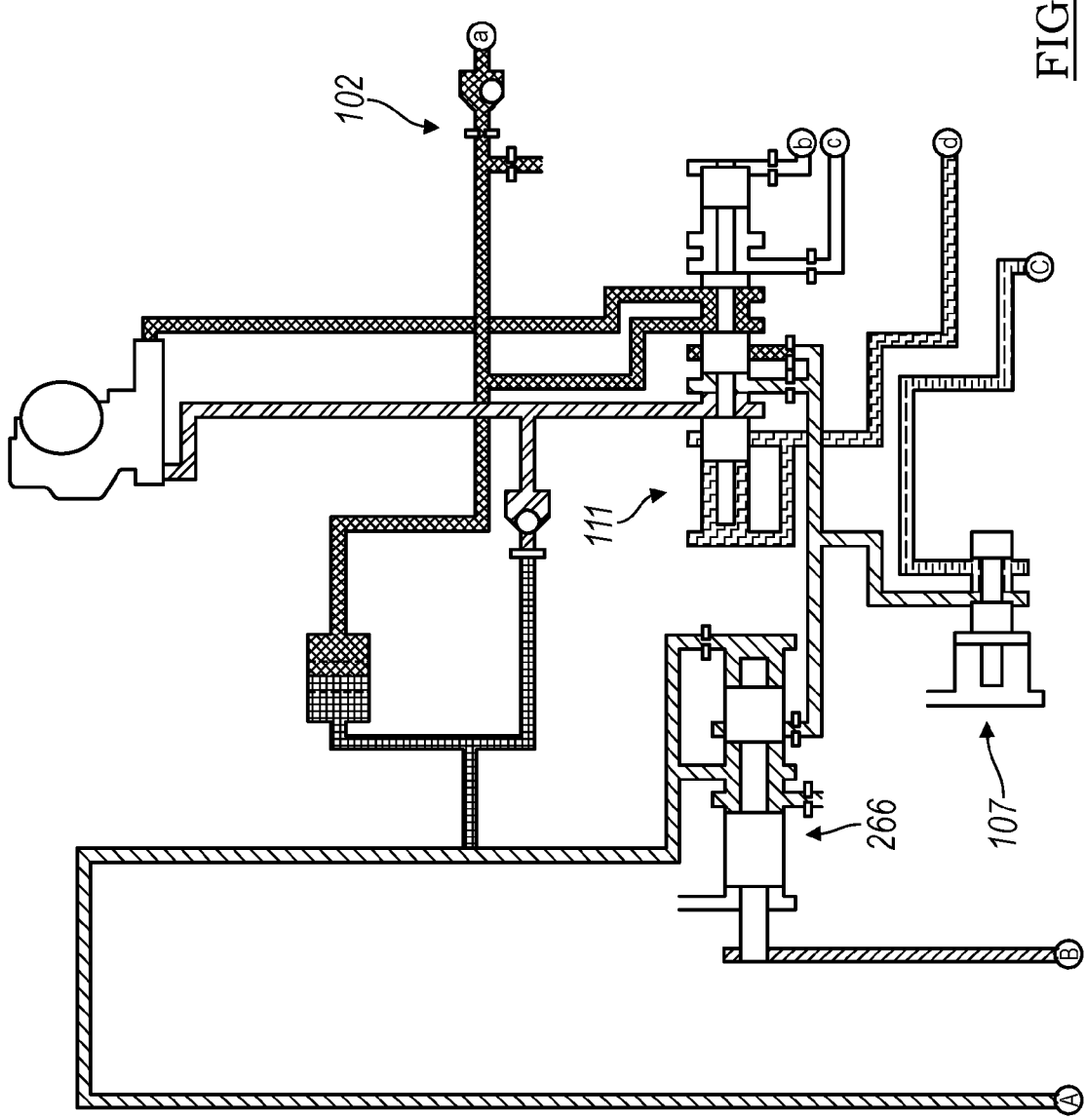
FIGS. 3A-3F describe yet another embodiment of a hydraulic control system having a manual valve in accordance the principles of the present invention.
Figure 3B:
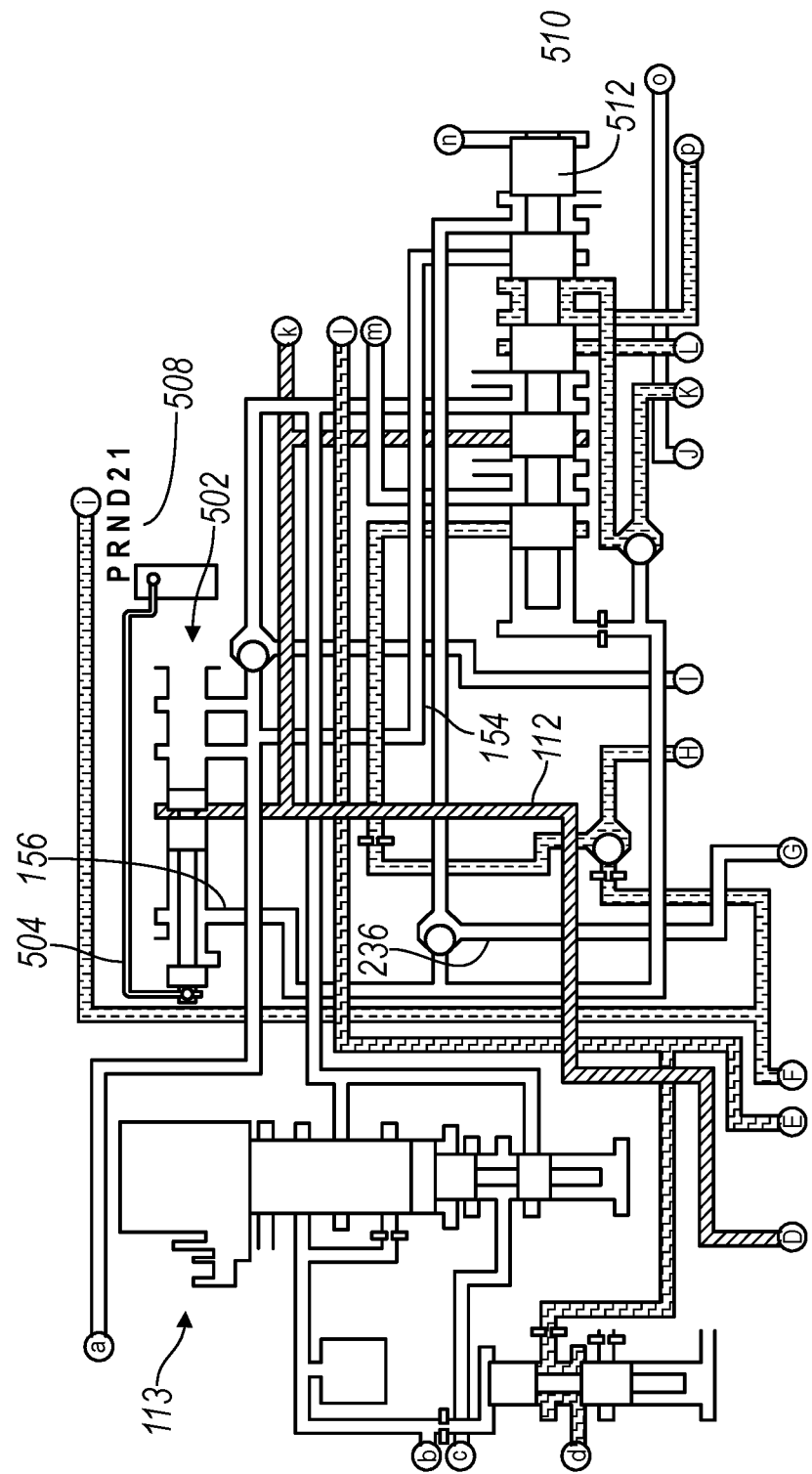
Figure 3C:
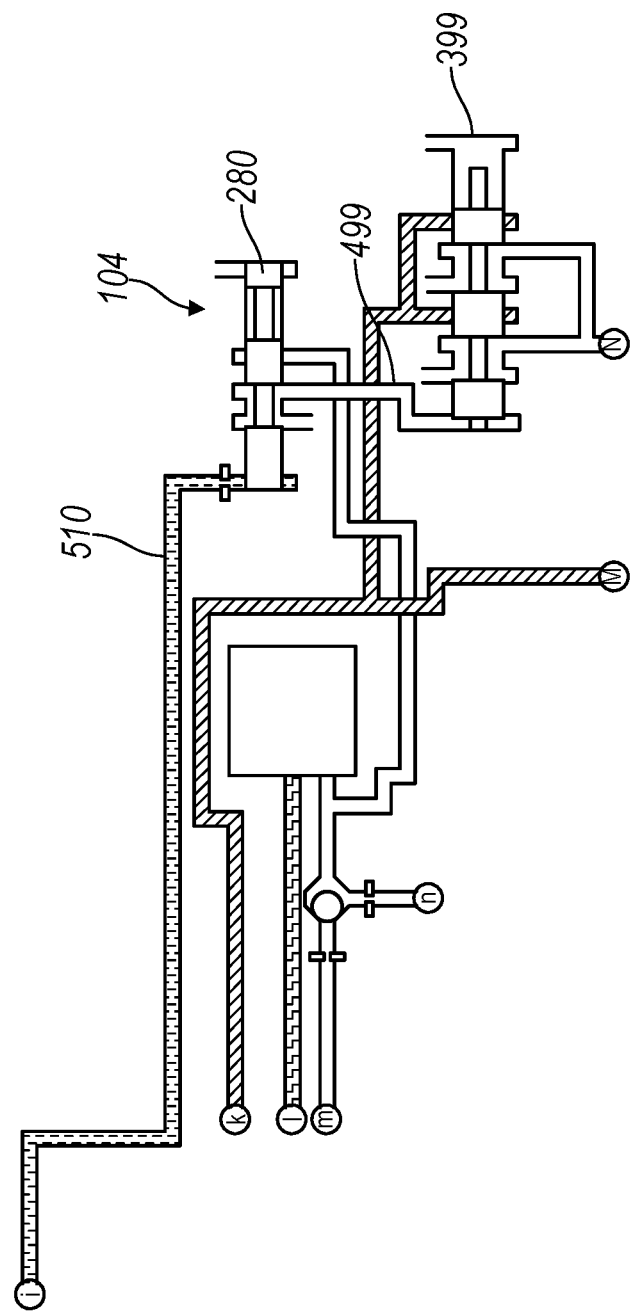
Figure 3D:
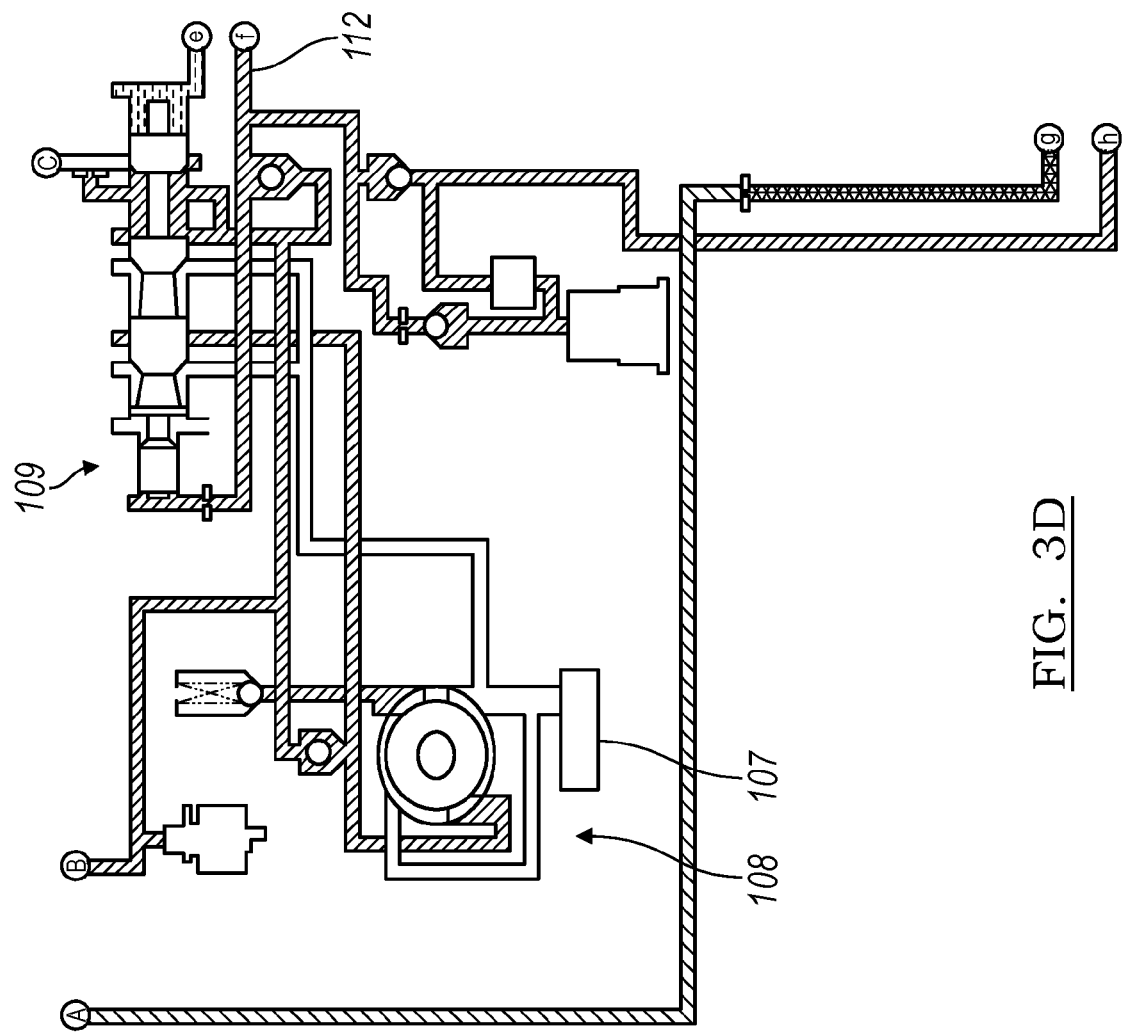
Figure 3E:
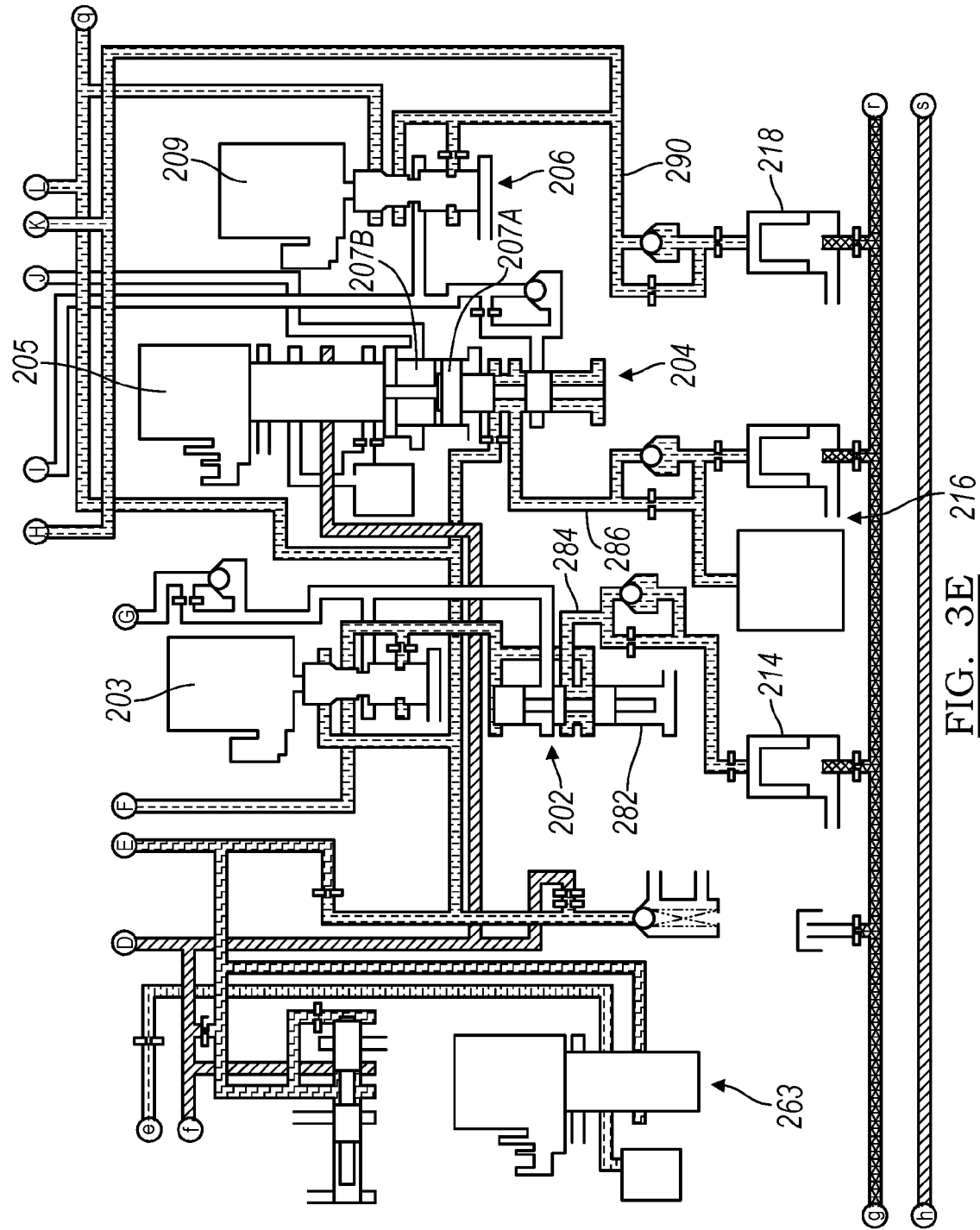
Figure 3F:
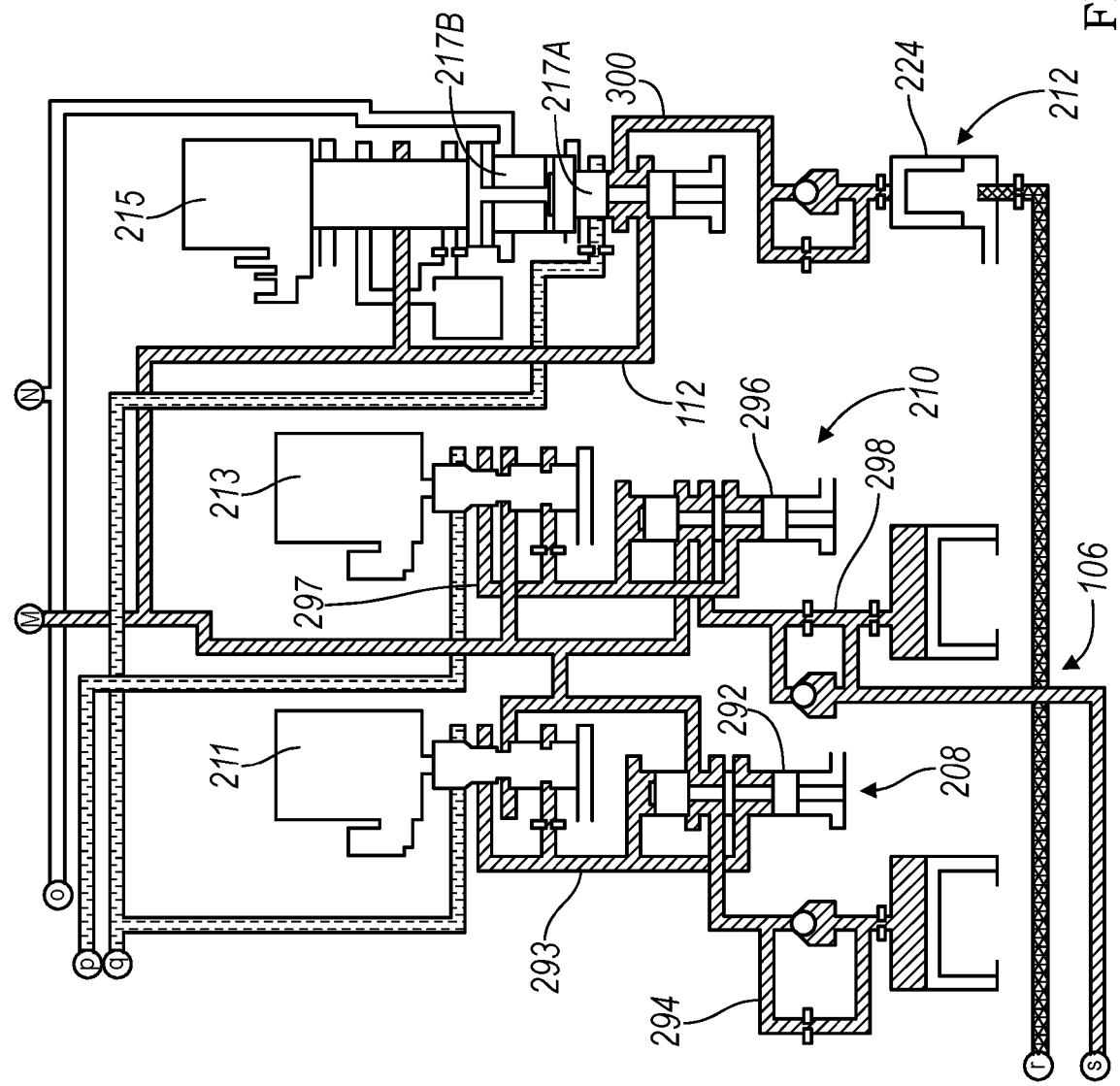

Turning to FIGS. 3A-3F, another arrangement of a hydraulic control system is generally indicated by reference number 500. The hydraulic control system 400 is substantially similar to that shown in FIGS. 1A-1F and like components are indicated by like reference numbers. However, in the hydraulic control system 500, the ETRS subsystem has been replaced by a manual valve 502 and a default valve 510. The manual valve 502 communicates with the main supply line 112, the Reverse line 156, and the Drive line 154. Movement of a range selector 508 of an operator of the motor vehicle in turn translates the manual valve 502 between various positions including a Reverse position and a Drive position. In the Drive position, the main supply line 112 provides hydraulic fluid at line pressure to the Drive line 154. In the Reverse position, the main supply line 112 provides hydraulic fluid at line pressure to the Reverse line 156.

The default valve 510 includes a spool 512 slidably disposed in a bore. As the spool 512 reciprocates within the bore, the default valve selectively communicates with the main supply line 112, the Drive line 154, the Reverse line 156, and the clutch regulation assemblies 202, 204, 206, 208, 210, and 212.

The description of the invention is merely exemplary in nature and variations that do not depart from the general essence of the invention are intended to be within the scope of the invention. Such variations are not to be regarded as a departure from the spirit and scope of the invention.

What is claimed is:

1. A hydraulic control system for a ten-speed automatic transmission, the hydraulic control system comprising:
    a pressure regulator subsystem with a source of pressurized hydraulic fluid for providing a flow of hydraulic fluid;
    a manual valve and a default valve;
    a clutch gain enable valve that communicates with the default valve;
    a clutch gain valve that communicates with the clutch gain enable valve, the manual valve and the default valve; and
    a clutch actuation control subsystem that provides pressurized hydraulic fluid to a plurality of clutch actuators through a plurality of clutch valve assemblies,
    wherein the manual valve and the default valve connects the pressure regulator subsystem with the clutch control subsystem and wherein movement of a range selector translates the manual valve to various Drive and Reverse positions.

2. The hydraulic control system of claim 1 wherein the plurality of clutch actuators includes six clutch actuators.

3. The hydraulic control system of claim 2 wherein each of the clutch actuators is a hydraulically actuated piston that engages one of a plurality of torque transmitting devices to achieve a desired speed ratio.

* * * * *